United States Patent
Li et al.

(10) Patent No.: US 11,507,244 B2
(45) Date of Patent: Nov. 22, 2022

(54) WINDOW ADJUSTMENT METHOD, WINDOW ADJUSTMENT DEVICE AND MOBILE TERMINAL

(71) Applicant: GUANGDONG OPPO MOBILE TELECOMMUNICATIONS CORP., LTD., Guangdong (CN)

(72) Inventors: Tongxi Li, Guangdong (CN); Liangjing Fu, Guangdong (CN); Zhiyong Lin, Guangdong (CN); Lei Jing, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/191,414

(22) Filed: Mar. 3, 2021

(65) Prior Publication Data

US 2021/0191579 A1 Jun. 24, 2021

Related U.S. Application Data

(63) Continuation-in-part of application No. PCT/CN2019/096549, filed on Jul. 18, 2019.

(30) Foreign Application Priority Data

Sep. 5, 2018 (CN) .......................... 201811030385.0

(51) Int. Cl.
*G06F 3/0481* (2022.01)
(52) U.S. Cl.
CPC ................................ *G06F 3/0481* (2013.01)

(58) Field of Classification Search
CPC ......... G06F 3/0481; G06F 2203/04803; G06F 9/452; G06F 16/2282
See application file for complete search history.

(56) References Cited

U.S. PATENT DOCUMENTS

| 5,666,498 A | 9/1997 | Amro |
| 6,025,841 A | 2/2000 | Finkelstein et al. |

(Continued)

FOREIGN PATENT DOCUMENTS

| CN | 103164269 | 6/2013 |
| CN | 104808959 | 7/2015 |

(Continued)

OTHER PUBLICATIONS

SIPO, Decision of Rejection for CN Application No. 201811030385.0, dated Apr. 2, 2021.

(Continued)

*Primary Examiner* — Mong-Shune Chung
(74) *Attorney, Agent, or Firm* — Hodgson Russ LLP

(57) ABSTRACT

A window adjustment method, a window adjustment device, a mobile terminal and a computer readable storage medium. The window adjustment method comprises: detecting the number of free windows displayed by a mobile terminal (101); if the number of the windows is not less than two, determining a free window to be adjusted among the free windows displayed by the mobile terminal (102); acquiring an adjustment parameter, and adjusting, on the basis of the adjustment parameter, the free window to be adjusted (103), the adjustment parameter comprising a positional parameter and/or a size parameter. The method allows a user to adjust a window according to his/her needs, so as to avoid the window being blocked and affecting the use thereof by the user.

10 Claims, 7 Drawing Sheets

```
                                                      ┌─ S101
┌──────────────────────────────────────────────────────┐
│ detecting the number of freeform windows displayed by a mobile terminal │
└──────────────────────────────────────────────────────┘
                              │
                              ▼                       ┌─ S102
┌──────────────────────────────────────────────────────┐
│ determining one of the freeform windows displayed by the mobile terminal │
│ as a freeform window to-be-adjusted, when the number of the freeform │
│ windows is not less than two                         │
└──────────────────────────────────────────────────────┘
                              │
                              ▼                       ┌─ S103
┌──────────────────────────────────────────────────────┐
│ acquiring adjustment parameters and adjusting the freeform window to-be- │
│ adjusted based on the adjustment parameters          │
└──────────────────────────────────────────────────────┘
```

(56) References Cited

U.S. PATENT DOCUMENTS

| | | | |
|---|---|---|---|
| 6,342,908 B1 | 1/2002 | Bates et al. | |
| 7,146,573 B2* | 12/2006 | Brown | G06F 3/0481 |
| | | | 715/788 |
| 2004/0268263 A1 | 12/2004 | Van Dok et al. | |
| 2008/0052637 A1* | 2/2008 | Ben-Yoseph | G06F 3/0481 |
| | | | 715/800 |
| 2009/0031243 A1* | 1/2009 | Kano | G06F 3/0483 |
| | | | 715/781 |
| 2010/0293148 A1* | 11/2010 | Cesario | G06F 11/1451 |
| | | | 707/E17.007 |
| 2013/0283206 A1* | 10/2013 | Kim | G06F 3/0481 |
| | | | 715/788 |
| 2013/0339284 A1* | 12/2013 | Rowles | G06Q 30/0202 |
| | | | 706/46 |
| 2014/0325431 A1 | 10/2014 | Vranjes et al. | |
| 2015/0058799 A1 | 2/2015 | Kao et al. | |
| 2015/0121270 A1 | 4/2015 | Wang et al. | |
| 2017/0293389 A1* | 10/2017 | Itakura | G06F 3/04886 |
| 2017/0357416 A1* | 12/2017 | Jing | G06F 3/0481 |
| 2018/0181289 A1* | 6/2018 | Weksler | G06F 3/04847 |
| 2018/0239521 A1* | 8/2018 | Bastide | G06F 3/0481 |
| 2021/0124480 A1* | 4/2021 | Fu | G06F 3/0488 |

FOREIGN PATENT DOCUMENTS

| | | |
|---|---|---|
| CN | 105005427 | 10/2015 |
| CN | 106201166 | 12/2016 |
| CN | 106445286 | 2/2017 |
| CN | 107122149 | 9/2017 |
| CN | 107168673 | 9/2017 |
| JP | 2003186593 | 7/2003 |

OTHER PUBLICATIONS

EPO, Extended European Search Report for EP Application No. 19857434.5, dated Sep. 28, 2021.

SIPO, First Office Action For CN Application No. 201811030385.0, dated Mar. 23, 2020.

SIPO, Second Office Action For CN Application No. 201811030385.0, dated Dec. 22, 2020.

WIPO, International Search Report For PCT application No. PCT/CN2019/096549, dated Oct. 16, 2019.

* cited by examiner

WINDOW ADJUSTMENT METHOD, WINDOW ADJUSTMENT DEVICE AND MOBILE TERMINAL

CROSS REFERENCE TO RELATED APPLICATIONS

This application is a continuation-in-part of International Application. No. PCT/CN2019/096549, filed Jul. 18, 2019, which claims priority to Chinese Application No. 201811030385.0, filed on Sep. 5, 2018. The entire contents of the aforementioned applications are incorporated by reference herein.

TECHNICAL FIELD

The present disclosure relates to the field of mobile terminal technologies, and more particularly, to a window adjustment method, a window adjustment device, a mobile terminal, and a computer-readable storage medium.

BACKGROUND

The Android system generally provides a multi-window display function. When the multi-window display function is performed, a user can only control the window to call in or call out, and cannot adjust parameters of the window, such as a size and a position of the window.

SUMMARY

The present disclosure provides a window adjustment method, a window adjustment device, a mobile terminal, and a computer-readable storage medium, enabling a user to adjust a window according to his own requirements, avoiding the window being blocked and affecting the user to use it. The technical solutions are as follows.

In an aspect, a window adjustment method is provided. The method comprises: detecting the number of freeform windows displayed by a mobile terminal;
determining one of the freeform windows displayed by the mobile terminal as a freeform window to-be-adjusted, when the number of the freeform windows is not less than two; and
acquiring adjustment parameters and adjusting the freeform window to-be-adjusted based on the adjustment parameters, the adjustment parameters comprising a position parameter and/or a size parameter.

In a second aspect, a window adjustment device is provided. The device comprises: a detecting unit, configured for detecting the number of freeform windows displayed by a mobile terminal;
a determination unit, configured for determining one of the freeform windows displayed by the mobile terminal as a freeform window to-be-adjusted, when the number of the freeform windows is not less than two;
an acquiring unit, configured for acquiring adjustment parameters; and
an adjusting unit, configured for adjusting the freeform window to-be-adjusted based on the adjustment parameters, the adjustment parameters comprising a position parameter and/or a size parameter.

In a third aspect, a mobile terminal is provided. The mobile terminal comprises a memory, a processor, and a computer program running on the processor and stored in the memory. The processor performs the method of the first aspect when executing the computer program.

In a fourth aspect, a computer readable medium is provided. The computer readable medium comprises a computer program stored therein, steps of the method of the first aspect is performed when the computer program is executed by a processor.

In a fifth aspect, a computer program product is provided. The computer program product comprises a computer program stored therein, steps of the method of the first aspect is performed when the computer program is executed by one or more processors.

BRIEF DESCRIPTION OF THE DRAWINGS

In order to more clearly describe the technical solutions of the disclosure, the following briefly introduces the drawings needed to be used in the description of the embodiments. Obviously, the drawings in the following description only illustrate some embodiments of the disclosure, and other drawings can be obtained for those skilled in the art, based on these drawings without any creative work.

DETAILED DESCRIPTION OF PREFERRED EMBODIMENTS

Figure 1:
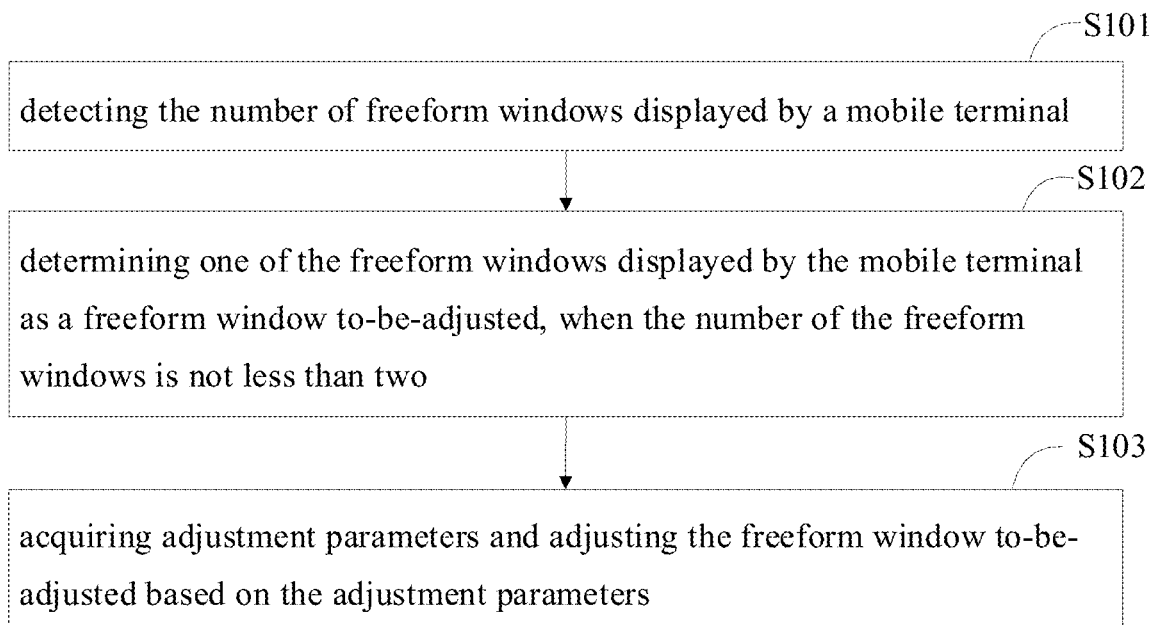
FIG. 1 is a schematic flowchart of a window adjustment method, according to an embodiment of the disclosure.

In the following description, for the purpose of illustration rather than limitation, specific details such as specific system structures and technologies are proposed for a thorough understanding of the embodiments of the disclosure. However, it should be clear to those skilled in the art that this application can also be implemented in other embodiments without these specific details. In other cases, detailed descriptions of well-known systems, devices, circuits, and methods are omitted to avoid unnecessary details from obstructing the description of this application.

In order to illustrate the above-mentioned technical solutions of the disclosure, specific embodiments are provided below.

Embodiment 1

A window adjustment method according to an embodiment of the present disclosure is provided. Referring to FIG.

1, the window adjustment method in the embodiment of the present disclosure includes steps 101-103.

Step 101: the number of freeform windows displayed by a mobile terminal is detected.

In the embodiment of the present disclosure, when only one window is displayed in full screen on a foreground of the mobile terminal, it is considered that this window is not a freeform window. When a window is displayed in a non-full screen form on the foreground, such a window is considered to be a freeform window. In addition, when there are more than two windows displayed on the foreground, the above two or more windows are freeform windows. In this embodiment, the above-mentioned freeform windows refer to windows in a Freeform mode. The freeform windows each include complete components of a normal active window such as an activity, a window, a focus, and an input. A user can drag the freeform window, and perform open, close and/or other operations on the freeform window. Furthermore, multiple freeform windows can be displayed on a screen of the mobile terminal to achieve a multi-window display. As to an Android system, it can be determined whether support the Freeform mode by defining ActivityManagerService, when a specific Freeform Stack is defined, all Freeform mode activities will be started in the specific Freeform Stack. There are no corresponding stacks existing in the Freeform mode, but one Freeform Stack is provided with several existing Tasks. In the Freeform mode, it is not a Stack bound but a Task bound that determines a display position of the activity, that is, each Task has a corresponding bound. In a non-Freeform mode, it is the Stack bound that determines the display position of the activity, and each activity is displayed in an area of the Stack bound to which it belongs.

Step 102, if the number of the freeform windows is not less than two, a freeform window to-be-adjusted is determined from the freeform windows displayed by the mobile terminal.

In this embodiment, if it is detected that the number of the above-mentioned freeform windows is not less than two, it is necessary to determine the freeform windows to-be-adjusted from the freeform windows displayed on the mobile terminal. For example, the freeform window to-be-adjusted can be determined, according to a selected instruction input by the user, from the freeform windows displayed in the foreground. In another example, the freeform window to-be-adjusted can also be determined according to a user behavior or properties of every application corresponding to each freeform window. The freeform window to-be-adjusted can also be determined in other ways, which are not limited here.

Step 103, adjustment parameters are acquired, and the freeform window to-be-adjusted is adjusted based on the adjustment parameters.

In this embodiment, the adjustment parameters include one or more position parameters and/or one or more size parameters of the freeform window after being adjusted. When the adjustment parameters are obtained, the position parameters and/or size parameters of the freeform window to-be-adjusted are placed by the adjustment parameters. The above adjustment parameters can be input by the user or defaulted by the system, and are not limited in the disclosure. For example, an edge of the freeform window to-be-adjusted can be dragged by the user inputting a sliding instruction, or the position of the freeform window to-be-adjusted can be dragged by the user inputting another sliding instruction, or the position and/or size of the freeform window to-be-adjusted can be changed according to the adjustment parameters preset by the system.

It can be seen from the above embodiment, when there are multiple freeform windows, the freeform window to-be-adjusted can be firstly determined, and then the freeform window can be accordingly adjusted based on the adjustment parameters. In this manner, the user can make adjustments to the freeform windows according to his own needs, thereby preventing the freeform window from being blocked (e.g., by other windows) and affecting the usage of the user.

It should be understood that the value of the serial number of each step in the foregoing embodiment does not mean the order of execution. An execution sequence of each step should be determined by its function and internal logic, and should not constitute any limitation on implementation processes of the embodiment of the present disclosure.

Embodiment 2

Figure 2:
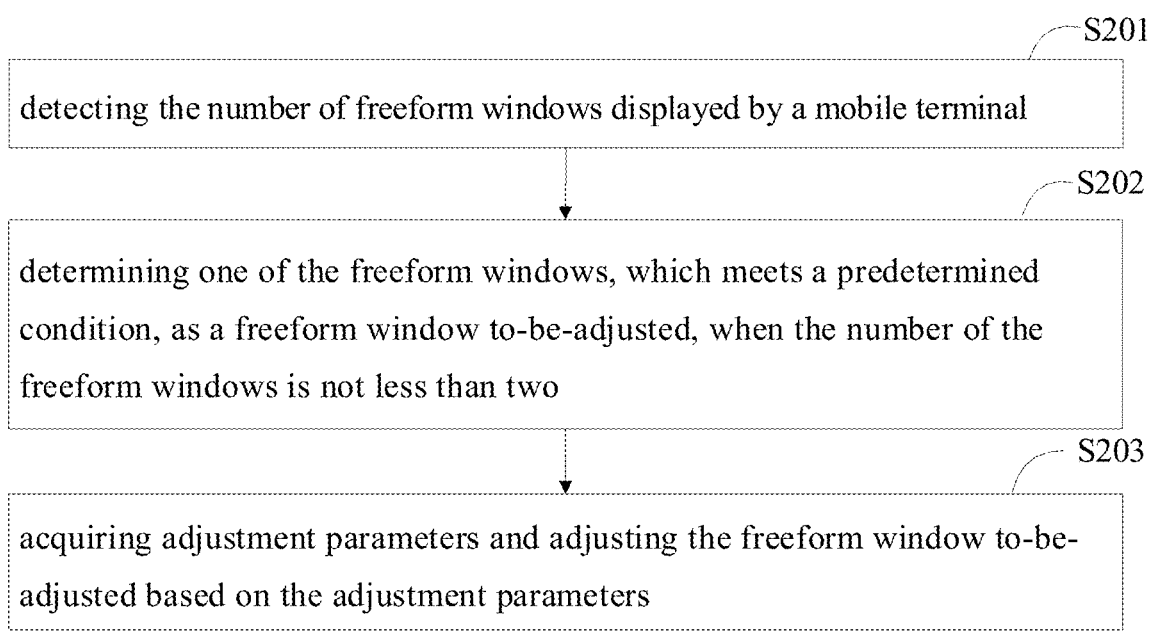
FIG. 2 is a schematic flowchart of a window adjustment method, according to another embodiment of the disclosure.

A window adjustment method according to another embodiment of the present disclosure is provided based on the above described embodiment. Referring to FIG. 2, the window adjustment method of this embodiment includes steps 201-203.

Step 201: the number of freeform windows displayed by the mobile terminal is detected.

Step 201 is the same as or similar to the step 101, details can be referred to the relevant description of step 101 above, which will not be repeated here.

Step 202, if the number of the freeform windows is not less than two, one of the freeform windows that meets a predetermined condition is determined as the freeform window to-be-adjusted.

In the embodiment of the present disclosure, the predetermined condition includes at least one of: a trigger operation time is closest to the current time, or the number of trigger operations is the largest. Optionally, for the predetermined condition that the number of the trigger operations is the largest, the user can preset a time duration for counting the trigger operations, and count the number of trigger operations on each of the freeform windows displayed by the mobile terminal during the time duration. In a typical example, the time duration may be set from a moment that the mobile terminal begins to display the freeform windows until the current time. In a typical application scenario, the predetermined condition is that the trigger operation time is closest to the current time; it is assumed that three windows, i.e., a WINDOW1, a WINDOW2, and a WINDOW3, respectively display application programs APP1, APP2, and APP3 in the foreground of the mobile terminal, and it is found, by monitoring the three windows, that a latest trigger operation performed on the APP1 is 10 minutes ago, a latest trigger operation performed on the APP2 is 3 minutes ago, and a latest trigger operation performed on the APP3 is 10 seconds ago; so it can be determined that the WINDOW3 corresponding to the APP3 is the freeform window to-be-adjusted. In another application scenario, the predetermined condition is that the number of trigger operations is the largest one. For example, it is assumed that the above three windows (i.e., the WINDOW1, the WINDOW2, and the WINDOW3) are monitored, and it is found that, after the mobile terminal enters the Freeform mode, the number of trigger operations by the user performed on the APP1 is 1 time, the number of trigger operations to the APP2 is 10 times, and the number of trigger operations on the APP3 is 5 times, so it can be determined that the WINDOW2 corresponding to the APP2 is the freeform window to-beadjusted. In this manner, the user is not required to actively select the freeform window to-be-adjusted, and the freeform window to-be-adjusted can be intelligently determined according to the user's behavior.

Step 203: adjustment parameters are acquired, and the freeform window to-be-adjusted is adjusted based on the adjustment parameters.

Step 203 is the same as or similar to step 103, details can be referred to the relevant description of step 103 above, which will not be repeated here.

It can be seen from the above embodiment, when there are multiple freeform windows, the mobile terminal can intelligently determine the freeform window to-be-adjusted, and then the freeform window can be accordingly adjusted based on the adjustment parameters. In this manner, the user can make adjustments to the freeform windows to prevent the freeform windows from being blocked (by other windows).

It should be understood that a sequence number of each step in the foregoing embodiment does not mean an order of execution. An execution sequence of each process should be determined by its function and internal logic, and should not constitute any limitation on the implementation process of the embodiment of the present disclosure.

Embodiment 3

Figure 3:
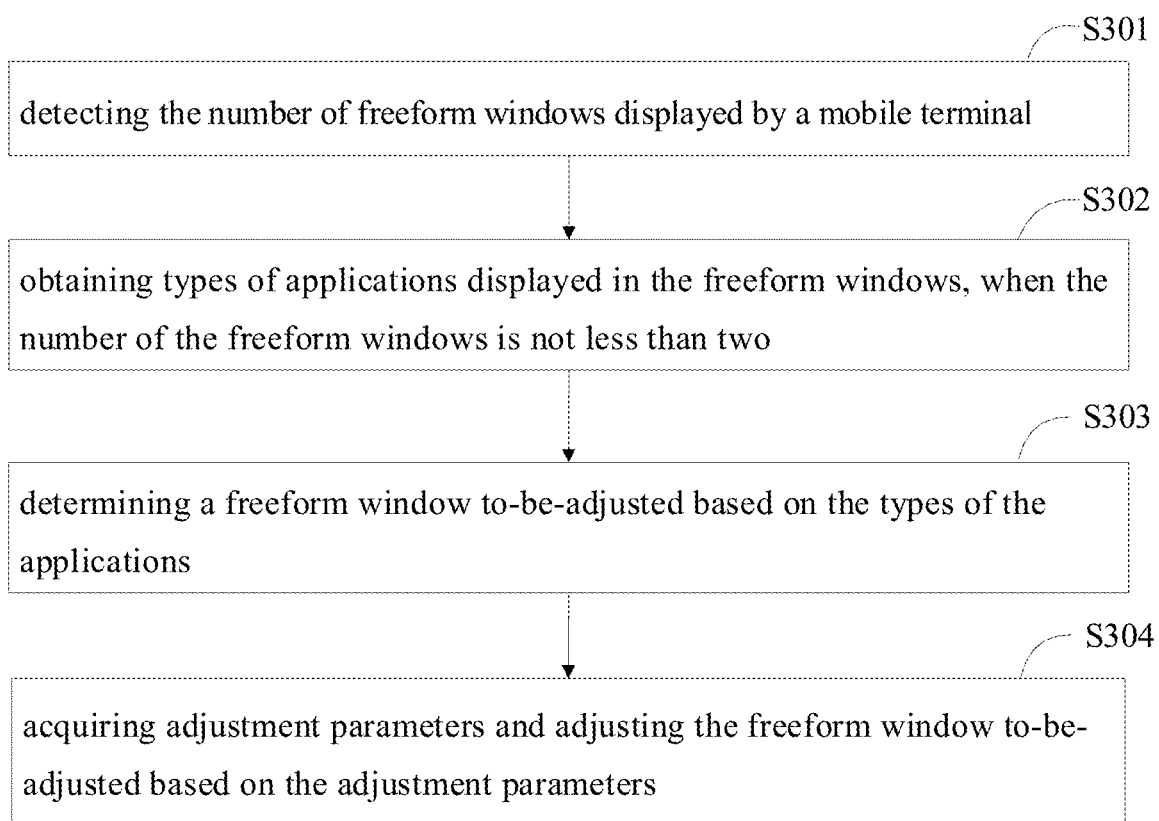
FIG. 3 is a schematic flowchart of a window adjustment method, according to still another embodiment of the disclosure.

Based on the EMBODIMENT 1, a window adjustment method according to still another embodiment of the present disclosure is provided. Referring to FIG. 3. The window adjustment method of the third embodiment includes steps 301-303.

Step 301: the number of freeform windows displayed by a mobile terminal is detected.

Step 301 is the same as or similar to step 101, details can be referred to the relevant description of step 101 above, which and will not be repeated here.

Step 302, if the number of the freeform windows is not less than two, one or more types of the applications displayed in the freeform windows are acquired.

The freeform window can display applications in any type. In use, a complete display interface of a certain type of application is needed to be viewed when these applications are running, such as video applications, game applications, and the like, therefore the type of the application displayed in the freeform window can be obtained, as a basis for a subsequent determining the free window to-be-adjusted.

Step 303: the freeform window to-be-adjusted is determined according to the one or more types of the applications.

The freeform window corresponding to a preset type can be determined as the freeform window to-be-adjusted. In use, for example, the preset type is a game type; if the mobile terminal has three windows, i.e., a WINDOW1 displaying an application APP1, a WINDOW2 displaying an application APP2, and a WINDOW3 displaying an application APP3, running on the foreground; according to step 302, it is obtained that the APP1 (e.g., WeChat) is a social application, the APP2 is a game application, and the APP3 (e.g., Taobao) is a shopping application, then the WINDOW 2 corresponding to the APP2 is determined as the freeform window to-be-adjusted. It is noted, the above-mentioned preset type can be adjusted according to requirements of the user, and are not limited here. In alternative embodiments, if there are more than two applications meet the preset type, then the technical solution of the above embodiment 2 can be adopted to determine the freeform window to-be-adjusted according to the predetermined condition.

Step 304, adjustment parameters are obtained, and the freeform window to-be-adjusted is adjusted based on the adjustment parameters.

In this embodiment, the adjustment parameters may be obtained based on the type of the application displayed in the freeform window to-be-adjusted, and the freeform window to-be-adjusted may be adjusted according to the adjustment parameters. To personalize the window parameters of the freeform windows corresponding to different types, the above window adjustment method may further include:

creating an application type-window parameter comparison table, wherein window parameters include a size parameter and a position parameter of the freeform window; and setting, in the application type-window parameter comparison table, corresponding window parameters according to types of different applications.

Accordingly, in the above step 304 detailly includes:

searching corresponding window parameters from the application type—window parameter comparison table, according to the type of the application displayed in the freeform window to-be-adjusted; and taking the searched corresponding window parameters as the adjustment parameters, and adjusting the freeform window to-be-adjusted based on the adjustment parameters.

The application type-window parameter comparison table can be stored locally in the mobile terminal. In alternative embodiments, in order to avoid data loss, the application type—window parameter comparison table can be periodically uploaded and backed up to a cloud server. The user can set or change the corresponding window parameters for each different application type in the above application type-window parameter comparison table. In use, in order to improve efficiency of the user setting, a preview window may be displayed on a screen of the mobile terminal in real time when the user performs a setting or changing operation. The window parameters of the preview window are the window parameters currently set or changed by the user. In this manner, different types of applications can correspond to different window parameters in the above application type-window parameter comparison table, so that display size of the freeform window can be diversified and meets the user's operation requirements for specific applications.

It can be seen from the above embodiment, when there are multiple freeform windows, the mobile terminal can intelligently determine the freeform window to-be-adjusted from the displayed freeform windows, and different application types correspond to different adjustment parameters, so that the mobile terminal can adjust the freeform window to-be-adjusted based on the adjustment parameters, thereby allowing the user to adjust the freeform window according to his own requirements and avoiding the freeform window being blocked and affecting the user's use.

It should be understood that a sequence number of each step in the foregoing embodiment does not mean an order of execution. An execution sequence of each process should be determined by its function and internal logic, and should not constitute any limitation on the implementation process of the embodiment of the present disclosure.

In alternative embodiments, in order to simplify the user's full-screen/minimize operation of the freeform window, the step 103 in the first embodiment, the step 203 in the second embodiment, the step 303 in the third embodiment each may include:

displaying the above freeform window to-be-adjusted in full screen, when a size parameter of the adjustment parameters is not less than a preset first size threshold; and/or minimizing the freeform window to-be-adjusted, when the size parameter of the adjustment parameters is not greater than a preset second size threshold.

The first size threshold and the second size threshold can be set and changed by the user or the system of the mobile terminal, and the first size threshold and the second size threshold can also be set according to the number of displayed windows. For example, when the number of windows is greater than a predetermined number, both the first size threshold and the second size threshold can be set relatively small; when the number of windows is relatively small, the first size threshold and the second size threshold both can be set relatively larger. Specifically, each value of the number of the windows may correspond to a related first size threshold and a related second size threshold. When the user needs to perform a full-screen operation or a minimize operation on the mobile terminal, the size of the freeform window to-be-adjusted can be simply adjusted to a certain range by, for example, a sliding instruction, thereby quickly realizing the full-screen operation or the minimize operation.

Embodiment 4

Figure 4:
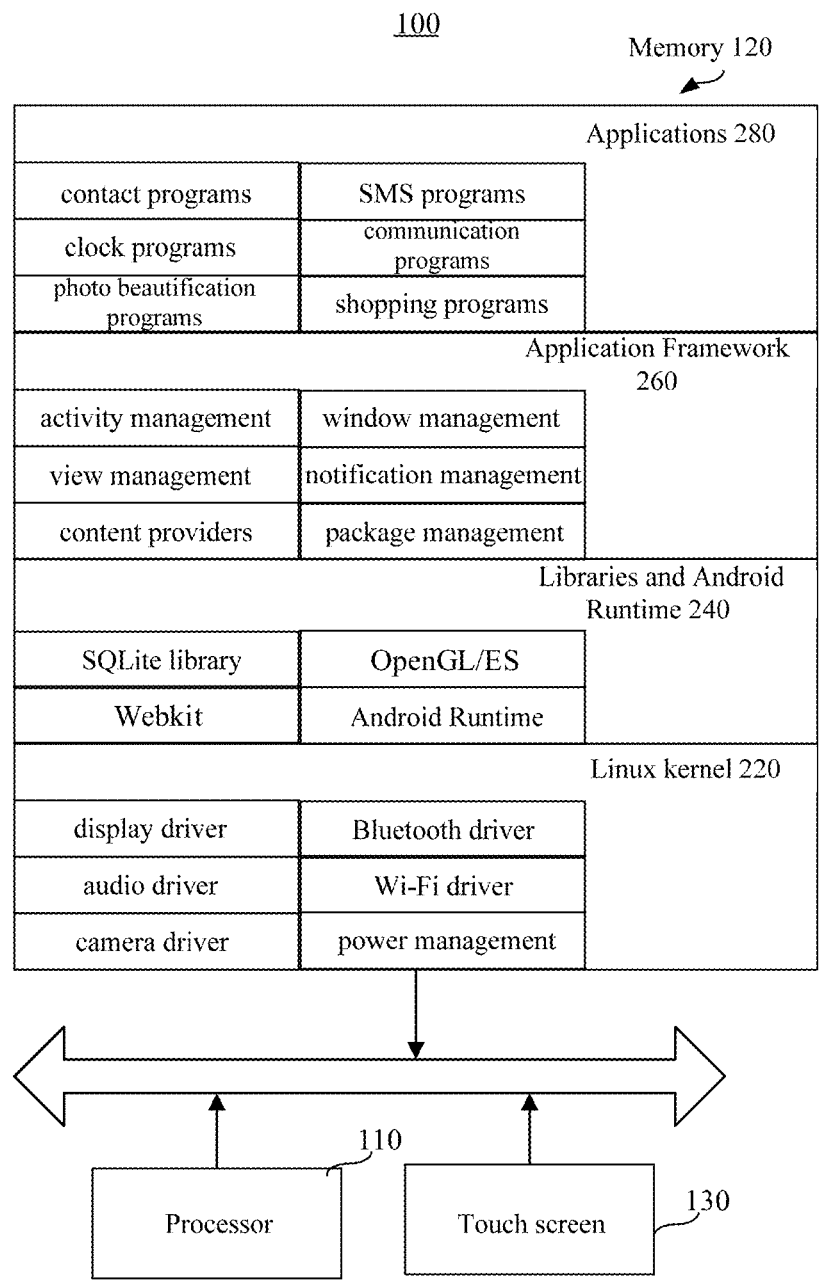
FIG. 4 is a schematic block diagram of a mobile terminal, according to an embodiment of the disclosure.
Figure 5:
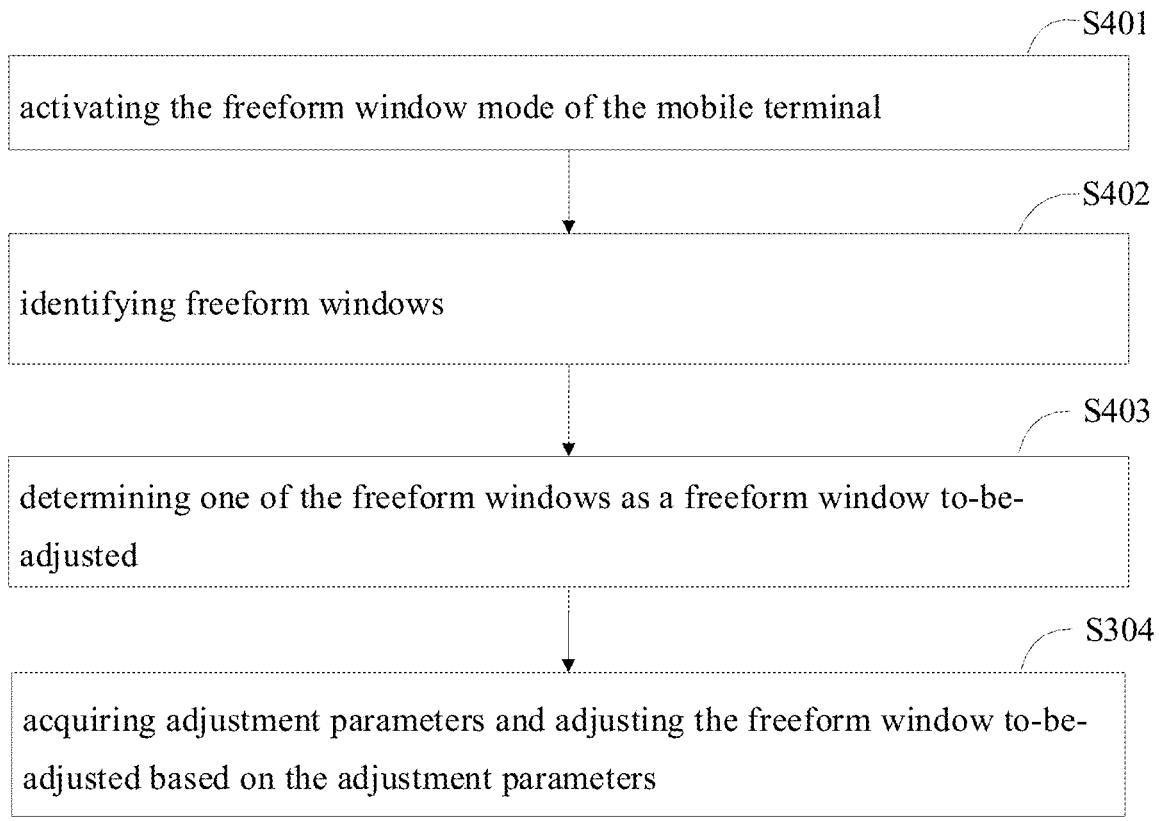
FIG. 5 is a schematic flowchart of a window adjustment method, according to still yet another embodiment of the disclosure.

FIG. 4 illustrates a window adjustment method according to still another embodiment of the disclosure. The method is applied to a mobile terminal 100 as illustrated in FIG. 5.

The mobile terminal 100 may be a mobile phone, a tablet computer, a notebook computer, an e-book or the like. The mobile terminal 100 of the disclosure may include one or more of the following components: a processor 110, a memory 120, and a touch screen 130

The processor 110 may include one or more processing cores. The processor 110 uses various interfaces and lines to connect various parts of the entire terminal 100, and executes the various functions and data processing of the terminal 100 by running or executing instructions, programs, code sets or instruction sets stored in the memory 120 and by calling data stored in the memory 120. Optionally, the processor 110 may use at least one hardware form of Digital Signal Processing (DSP), Field-Programmable Gate Array (FPGA), and Programmable Logic Array (PLA) to implement the executions. The processor 110 may integrate one or more of a Central Processing Unit (CPU), a Graphics Processing Unit (GPU), and a modem. The CPU mainly handles the operating system, user interfaces, and application programs; the GPU is responsible for rendering and drawing of the content required to be displayed by the touch screen 130; and the modem is used for processing wireless communication. It can be understood that the modem may not be integrated into the processor 110, and may be implemented by a single chip.

The memory 120 may include Random Access Memory (RAM), and may also just include Read-Only Memory. Optionally, the memory 120 includes a non-transitory computer-readable storage medium. The memory 120 may be used to store instructions, programs, codes, code sets, or instruction sets. The memory 120 may include a program storage area and a data storage area. The program storage area may be configured to store instructions for implementing an operating system, instructions for at least one function such as a touch function, a sound playback function, an image playback function, etc., the instructions for implementing the following method embodiments. The data storage area may store data such as audio data, phone book and the like that are created by the use of the terminal 100. The memory 120 also stores at least one instruction, which is configured to implement the information display method of the following embodiments when executed by the processor 110.

Taking the operating system is an Android system as an example, the programs and data stored in the memory 120 are shown in FIG. 1. The memory 120 stores the Linux kernel 220, the Libraries and Android Runtime 240, the Application Framework 260 and Applications 280. The Linux kernel 220 provides low-level drivers for various hardware of the terminal 100, such as a display driver, an audio driver, a camera driver, a Bluetooth driver, a Wi-Fi driver, and power management. The Libraries and Android Runtime 240 provides main feature support for the android system through some C/C++ libraries. For example, the SQLite library provides the support of database, the OpenGL/ES library provides the support of 3D drawing, and the Webkit library provides the support of browser kernel. The Libraries and Android Runtime 240 also provides the Android Runtime, which mainly provides some core libraries, which can allow developers to write Android applications using the Java language. The Application Framework 260 provides various APIs that may be used when building applications. Developers can also use these APIs to build their own applications, such as activity management, window management, view management, notification management, content providers, Package management, call management, resource management, location management. There is at least one application program is running in the Applications 280, and the at least one application program may be programs come with the operating system, such as contact programs, SMS programs, clock programs, camera applications, etc.; the at least one application program may be applications developed by third-party developers, such as communication programs, photo beautification programs, etc.

The Android system supports multi-window modes, such as a split-screen mode, a picture-in-picture mode, or a freeform window mode.

Specifically, the method may include the following steps.

Step S401, the freeform window mode of the mobile terminal 100 is activated.

Firstly, a current multi-window mode of the mobile terminal 100 is acquired. For example, Activity.isInMultiWindowMode( ) can be invoked to query whether it is in the multi-window mode. For another example, Activity.isInPictureInPictureMode( ) can be invoked to query whether it is in the picture-in-picture mode.

When the acquired current multi-window mode is the freeform window mode, then a next step S402 is performed.

When the acquired current multi-window mode is different from the freeform window mode, then the freeform window mode is activated.

Figure 6:
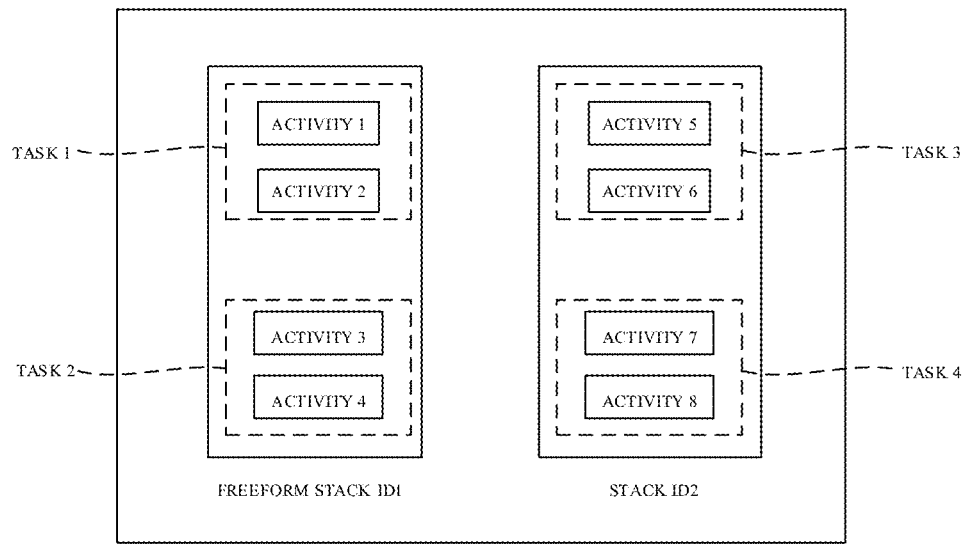
FIG. 6 is a schematic diagram of a freeform stack, according to an embodiment of the disclosure.

Specifically, at least one freeform stack is generated, the freeform stack has a stack ID, e.g., ID1. A previously opened application is moved to the generated freeform stack. The freeform stack includes at least one task, the task includes at least one activity, as illustrated in FIG. 6.

It is noted that the operation system also includes other stacks, e.g., a fullscreen stack, a home stack, and so on.

Step S402, freeform windows are identified and each freeform window is defined with an initial position and an initial window size.

Figure 7:
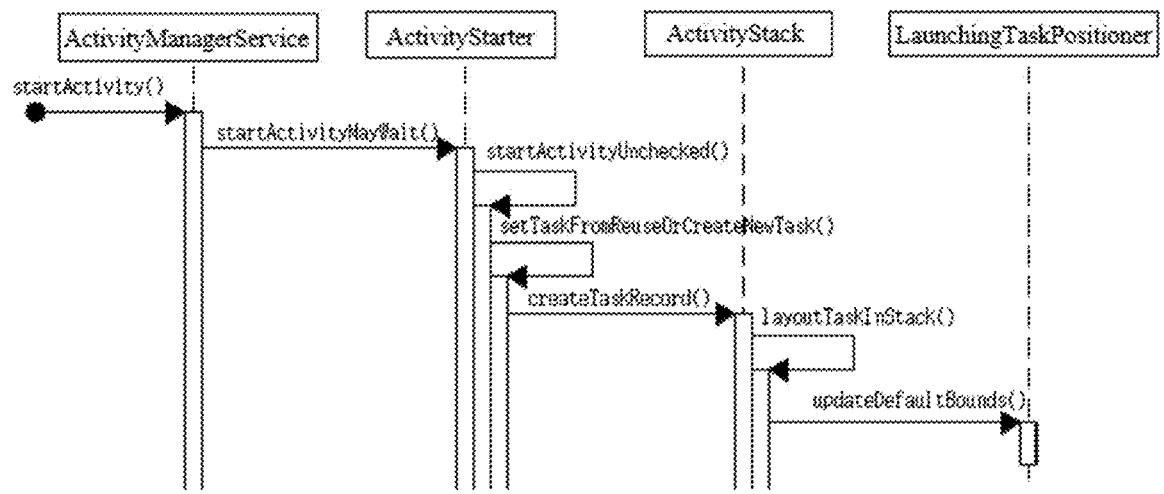
FIG. 7 is a schematic diagram showing defining default bounds of a freeform window, according to an embodiment of the disclosure.

It is noted that the layout and the size of the freeform windows is controlled by LaunchingTaskPositioner. However, the initial position and initial window size can be defined by setting Default Bounds when starting a corresponding activity of the freeform window, as illustrated in FIG. 7.

Each freeform window displays a corresponding application, so each freeform window corresponds to an application type. Application types of the freeform windows include but not limited to the following types: shopping, gaming, learning, watching, communicating, and so on.

Figure 8:
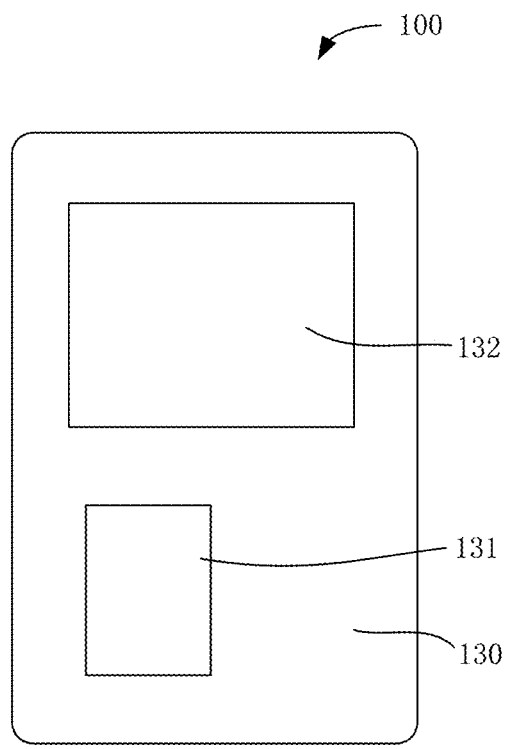
FIG. 8 is a schematic diagram showing two freeform windows with different window sizes, according to an embodiment of the disclosure.

Different freeform windows correspond to different application types, and correspond to different position and different size. For example, a first freeform window 131 corresponding to the communicating application type has a first position and a first size, a second freeform window 132 corresponding to the gaming application type has a second position and a second size, the first size is smaller than the second size, and the first freeform window 131 and the second freeform window 132 are positioned up and down and are not overlapped with each other, as illustrated in FIG. 8.

It can be understood that, an application type-window size lookup table may be stored in the memory 120, and the initial window size of each freeform window can be found by traversing the lookup table.

Step S403, when the number of freeform windows is greater than two, one of the freeform windows is determined as a freeform window to-be-adjusted.

For example, the freeform window to-be-adjusted can be determined by monitoring the focus of the freeform windows.

Step S404, adjustment parameters are acquired from input and the freeform window to-be-adjusted is adjusted according to the adjustment parameters.

The input event is monitored all the time. When the user performs operations on the freeform window to-be-adjusted displayed on the display screen 130, a corresponding input event is monitored, and corresponding adjustment parameters are determined from input information of the input event. However, it is noted that, a drag operation, an enlarge operation or any other operation performed on the freeform window to-be-adjusted is a process that changes any time. That is, the information of the input event is changed in real time, and the adjustment parameters are changed in real time.

Therefore, the bounds of the freeform window to-be-adjusted is changed in real time. For example, the bounds can be defined by ActivityOptions.setLaunchBounds( ).

Figure 9:
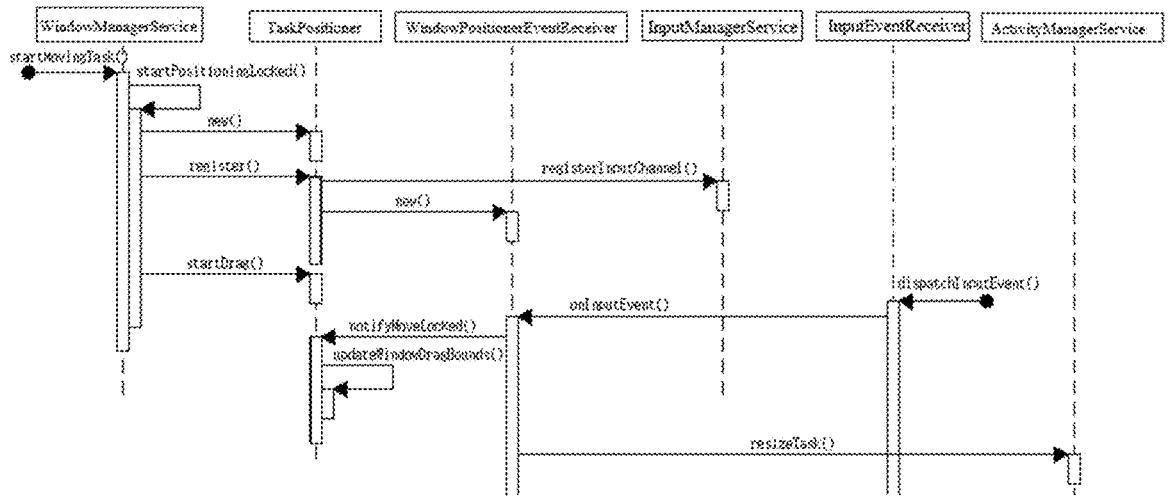
FIG. 9 is a schematic diagram showing moving and resizing a freeform window, according to an embodiment of the disclosure.

The adjusting of the freeform window to-be-adjusted may be illustrated in FIG. 9.

In particular, the application in the freeform window to-be-adjusted being displayed in different manners could be performed by moving the activity of the application in different stacks. For example, when the second freeform window 132 is displayed in full screen, the application displayed therein is moved from the freeform stack to the fullscreen stack.

Embodiment 5

Figure 10:
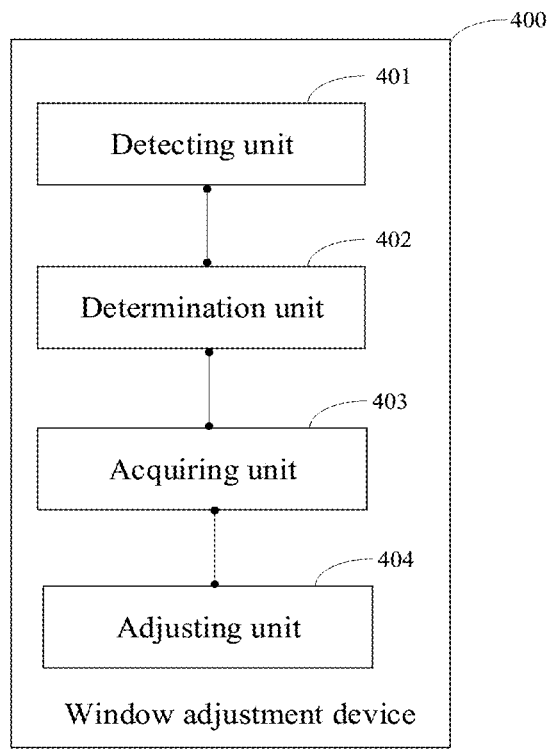
FIG. 10 is a block diagram of a window adjustment device according to an embodiment of the disclosure.

A window adjustment device 400 according to an embodiment of the present disclosure is provided. Referring to FIG. 10, the window adjustment device 400 in the embodiment of the present disclosure includes a detecting unit 401, a determination unit 402, an acquiring unit 403 and an adjusting unit 404.

The detecting unit 401 is configured to detect the number of freeform windows displayed by a mobile terminal.

The determination unit 402 is configured to determine a freeform window to-be-adjusted from the freeform windows displayed by the mobile terminal, when the number of the freeform windows is not less than two.

The acquiring unit 403 is configured to acquire adjustment parameters.

The adjusting unit 404 is configured to adjust the freeform window to-be-adjusted based on the adjustment parameters. The adjustment parameters include a position parameter and/or a size parameter.

In some embodiments, the determination unit 402 includes a type acquisition subunit and a first determining subunit.

The type acquisition subunit is configured to obtain one or more types of applications displayed in the freeform windows.

The first determining subunit is configured to determine the freeform window to-be-adjusted according to the one or more types of the applications.

In some embodiments, the determination unit 402 is specifically configured to obtain the adjustment parameters based on the type of the application displayed in the freeform window to-be-adjusted, and further adjust the freeform window to-be-adjusted according to the adjustment parameters.

In some embodiments, the window adjustment device 400 further includes a creating unit and a setting unit.

The creating unit is configured to create an application type—window parameter comparison table. The window parameters include size parameters and position parameters of the freeform window.

The setting unit is configured to set, in the application type—window parameter comparison table, corresponding window parameters for different types of applications.

The adjusting unit 404 includes a searching subunit and a window adjustment subunit.

The searching subunit is configured to search the corresponding window parameters in the application type-window parameter comparison table, according to the type of the application displayed in the freeform window to-be-adjusted.

The window adjustment subunit is configured to determine the corresponding window parameters as the adjustment parameters, and adjust the freeform window to-be-adjusted based on the adjustment parameters.

In some embodiments, the window adjustment device 400 may further include an uploading unit.

The uploading unit is configured to upload the application type-window parameter comparison table periodically to a cloud server.

In some embodiments, the determination unit 402 may further include a second determination subunit.

The second determination subunit is configured to determine one of the freeform windows displayed on the mobile terminal and meeting a predetermined condition as the freeform window to-be-adjusted. The predetermined condition includes at least one of: the time of a trigger operation is closest to the current time, or the number of trigger operations is the largest.

In some embodiments, the determination unit 402 may further include a statistic unit.

The statistic unit is configured to count the number of the trigger operations performed on the freeform windows displayed by the mobile terminal during a predetermined time interval respectively.

The adjusting unit 404 may include a full screen subunit and a minimizing subunit.

The full screen subunit is configured to display the above freeform window to-be-adjusted in full screen, when a size parameter of the adjustment parameters is not less than a preset first size threshold.

The minimizing subunit is configured to minimize the freeform window to-be-adjusted, when the size parameter of the adjustment parameters is not greater than a preset second size threshold.

In some embodiments, the adjusting unit 404 may further include a setting subunit.

The setting subunit is configured to set the first size threshold and the second size threshold according to the number of the windows.

It can be seen from the above embodiment, when there are multiple freeform windows, the freeform window to-be-adjusted can be firstly determined, and then the freeform window can be accordingly adjusted based on the adjustment parameters. In this manner, the user can make adjustments to the freeform windows to prevent the freeform windows from being blocked (by other windows).

Embodiment 6

Figure 11:
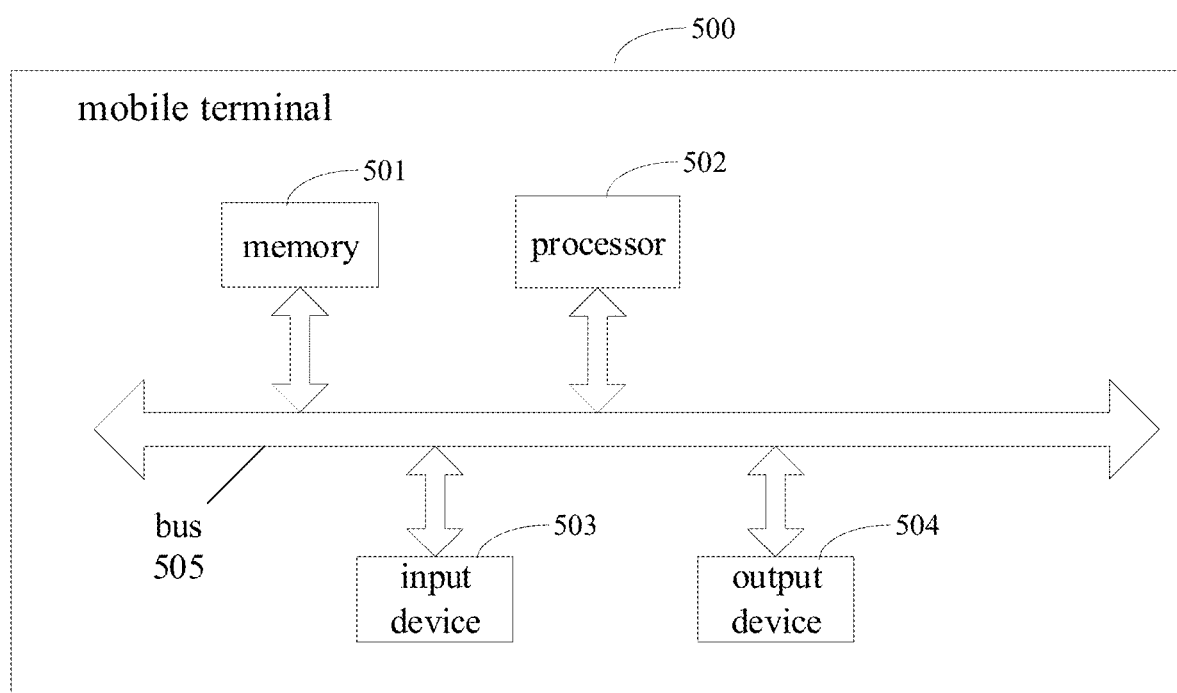
FIG. 11 is a schematic block diagram of a mobile terminal, according to an embodiment of the disclosure.

A mobile terminal 500 according to a fifth embodiment of the disclosure is provided. Referring to FIG. 11, the mobile terminal 500 in the embodiment of the present disclosure includes a memory 501, one or more processors 502 (only one processor is shown in FIG. 10), a computer program (not shown) running on the processor 502 and stored in the memory 501. The memory 501 is used to store software programs and modules. The processor 502 executes various functional applications and performs data processing by running the software programs and units stored in the memory 501 to obtain resources corresponding to the aforementioned preset events. Specifically, the processor 502 performs the following steps by running the foregoing computer program stored in the memory 501:

detecting the number of freeform windows displayed on the mobile terminal;

determining one of the freeform windows displayed on the mobile terminal as a freeform window to-be-adjusted, when the number of the freeform windows is not less than two; and acquiring adjustment parameters, and adjusting the freeform window to-be-adjusted based on the adjustment parameters, wherein the adjustment parameters include a position parameter and a size parameter.

Assuming the above is a first implementation manner, in a second implementation manner provided based on the first implementation manner, the step of determining one of the freeform windows displayed on the mobile terminal as a freeform window to-be-adjusted includes:

obtaining one or more types of applications displayed in the freeform windows; and determining the freeform window to-be-adjusted according to the one or more types of the applications.

In a third implementation manner provided based on the second implementation manner, the step of adjusting the freeform window to-be-adjusted based on the adjustment parameters includes:

obtaining the adjustment parameters based on the type of the application displayed in the freeform window to-be-adjusted, and further adjust the freeform window to-be-adjusted according to the adjustment parameters.

In a fourth implementation manner provided based on the third implementation manner, the processor 502 also performs the following steps when running the above-mentioned computer program stored in the memory 501:

creating an application type-window parameter comparison table, wherein the window parameters include a size parameter and a position parameter of the freeform window; and setting corresponding window parameters for different types of applications.

Accordingly, the step of obtaining the adjustment parameters based on the type of the application displayed in the freeform window to-be-adjusted, and adjusting the freeform window to-be-adjusted according to the adjustment parameters includes:

searching corresponding window parameters in the application type-window parameter comparison table, according to the type of the application displayed in the freeform window to-be-adjusted; and determining the corresponding window parameters as the adjustment parameters, and adjusting the freeform window to-be-adjusted based on the adjustment parameters.

In a fifth implementation manner provided based on the fourth implementation manner, the processor 502 can also perform the following steps when running the above-mentioned computer program stored in the memory 501:

uploading the type-window parameter comparison table periodically to a cloud server.

In a sixth implementation manner provided based on the fifth implementation manner, the above step of determining one of the freeform windows displayed on the mobile terminal as a freeform window to-be-adjusted includes:

determining one of freeform windows which meets a predetermined condition as the freeform window to-be-adjusted, wherein the predetermined condition includes at least one of: the time of a trigger operation is closest to the current time, and/or the number of trigger operations is the largest.

In a seventh implementation manner provided based on the sixth implementation manner, the processor 502 can also performs the following steps when running the above-mentioned computer program stored in the memory 501:

counting the number of the trigger operations respectively performed on the freeform windows displayed one the mobile terminal during a predetermined time interval.

In an eighth implementation manner provided based on any one of the first to the seventh implementation manners, the step of acquiring adjustment parameters, and adjusting the freeform window to-be-adjusted based on the adjustment parameters may include:

if a size parameter of the adjustment parameters is not less than a preset first size threshold, displaying the above freeform window to-be-adjusted in full screen; and if the size parameter of the adjustment parameters is not greater than a preset second size threshold, minimizing the freeform window to-be-adjusted.

In a ninth implementation manner provided based on the eighth implementation manner, the processor 502 also performs the following steps when running the above-mentioned computer program stored in the memory 501:

setting the first size threshold and the second size threshold according to the number of the windows.

As shown in FIG. 11, the mobile terminal may further include: one or more input devices 503 (only one input device is shown in FIG. 11) and one or more output devices 504 (only one output device is shown in FIG. 11). The memory 501, the processor 502, the input device 503, and the output device 504 are connected by a bus 505.

It should be understood that, the processor 502 in the disclosure may be a central processing unit (CPU), and the processor can be other general-purpose processors or digital signal processors (DSP), application specific integrated circuit (ASIC), field-programmable gate array (FPGA) or other programmable logic devices, discrete gates or transistor logic devices, discrete hardware components, etc. The general-purpose processor may be a microprocessor, or the processor may be any conventional processor, etc.

The input device 503 may include a keyboard, a touch panel, a fingerprint sensor (that can be used to collect user fingerprint information and fingerprint orientation information), a microphone, etc., and the output device 504 may include a display, a speaker, etc.

The memory 501 may include a read-only memory and a random access memory, and provides instructions and data to the processor 502. A part or all of the memory 501 may include a non-volatile random access memory. For example, the memory 501 may store information of device type.

It can be seen from the above embodiment, when there are multiple freeform windows, the freeform window to-be-adjusted can be firstly determined, and then the freeform window can be accordingly adjusted based on the adjustment parameters. In this manner, the user can make adjustments to the freeform windows to prevent the freeform windows from being blocked (by other windows).

Those skilled in the art can clearly understand that for the convenience and conciseness of description, only part of the above-mentioned functional units and modules is used as an example. In practical application, the above-mentioned functions can be allocated to different functional units and modules. That is, an internal structure of the above-mentioned device can be divided into different functional units or modules to complete all or part of the functions described above. The functional units and modules in the embodiments can be integrated into one processing unit, or each unit can exist alone physically, or two or more units can be integrated into one unit. The above-mentioned integrated units can be realized in the form of hardware, and can also be realized in the form of functional units of software. In addition, the specific names of the functional units and modules are only for the convenience of distinguishing each other, and are not used to limit the protection scope of the present disclosure. For the specific working process of the units and modules in the foregoing system, reference may be made to the corresponding process in the foregoing method embodiment, which is not repeated here.

In the above-mentioned embodiments, the description of each embodiment has its own emphasis. For parts that are not detailed or recorded in an embodiment, reference may be made to related descriptions of other embodiments.

A person of ordinary skill in the art may be aware that the units and algorithm steps of the examples described in combination with the embodiments disclosed herein can be implemented by electronic hardware, or a combination of external device software and electronic hardware. Whether these functions are executed by hardware or software depends on the specific application and design constraints of the technical solution. Professionals and technicians can use different methods for each specific application to implement the described functions, but such implementation should not be considered beyond the scope of this application.

In the embodiments provided in this application, it should be understood that the disclosed device and method may be implemented in other ways. For example, the system embodiments described above are only illustrative. For example, the division of the above-mentioned modules or units is only a logical function division. In actual implementation, there may be other division methods, for example, multiple units or components may be combined. Or it can be integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described above as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

If the aforementioned integrated unit is implemented in the form of a software functional unit and sold or used as an independent product, it can be stored in a computer-readable storage medium. Based on this understanding, this application implements all or part of the processes in the above-mentioned embodiments and methods, and can also be completed by instructing relevant hardware through a computer program. The above-mentioned computer program can be stored in a computer-readable storage medium. When executed by the processor, the steps of the foregoing method embodiments can be implemented. The above-mentioned computer program includes computer program code, and the above-mentioned computer program code may be in the form of source code, object code, executable file, or some intermediate forms. The above-mentioned computer-readable storage medium may include: any entity or device capable of carrying the above-mentioned computer program code, recording medium, U disk, mobile hard disk, magnetic disk, optical disk, computer readable memory, read-only memory (ROM, Read-Only Memory)), random access memory (RAM, Random Access Memory), electrical carrier signal, telecommunications signal, and software distribution media. It should be noted that the content contained in the above-mentioned computer-readable storage media can be appropriately added or deleted in accordance with the requirements of the legislation and patent practice in the jurisdiction. For example, in some jurisdictions, according to the legislation and patent practice, the computer-readable storage medium does not include electrical carrier signals and telecommunication signals.

The above-mentioned embodiments are only used to illustrate the technical solutions of the present application, not to limit them; although the present application has been described in detail with reference to the foregoing embodiments, those of ordinary skill in the art should understand that they can still compare the foregoing embodiments. The recorded technical solutions are modified, or some of the technical features are equivalently replaced; these modifications or replacements do not cause the essence of the corresponding technical solutions to deviate from the spirit and scope of the technical solutions of the embodiments of the application, and should be included in this within the scope of protection.

What is claimed is:
1. A window adjustment method, comprising:
  detecting a number of one or more freeform windows displayed on a mobile terminal;
  acquiring types of applications displayed in the freeform windows and determining one of the freeform windows displayed on the mobile terminal as a freeform window to-be-adjusted according to the types of applications, when the number of the one or more freeform windows is not less than two;

acquiring adjustment parameters and adjusting the freeform window to-be-adjusted based on the adjustment parameters, the adjustment parameters comprising at least one of a position parameter and a size parameter, wherein the adjustment parameters are acquired based on the type of the application displayed in the freeform window to-be-adjusted; and creating an application type-window parameter comparison table, which contains types of applications of freeform windows and corresponding window parameters, wherein the window parameters include size and position parameters, wherein the adjustment parameters are acquired by:

searching window parameters corresponding to the type of the application displayed in the freeform window to-be-adjusted in the application type-window parameter comparison table, and determining at least one of the position parameter and the size parameter included in the window parameters corresponding to the type of the application displayed in the freeform window to-be-adjusted as the adjustment parameters.

2. The window adjustment method of claim 1, further comprising:

uploading the application type-window parameter comparison table periodically to a cloud server.

3. The window adjustment method of claim 1, wherein the freeform window to-be-adjusted is adjusted by:

displaying the freeform window to-be-adjusted in full screen when the adjustment parameters comprise the size parameter being not less than a preset first size threshold.

4. The window adjustment method of claim 3, wherein when the freeform window to-be-adjusted is displayed in full screen, an application displayed in the freeform window to-be-adjusted is moved from a freeform stack to a fullscreen stack.

5. The window adjustment method of claim 1, wherein the freeform window to-be-adjusted is adjusted by:

Minimizing the freeform window to-be-adjusted when the adjustment parameters comprise the size parameter being not greater than a preset second size threshold.

6. A mobile terminal, comprising a display screen, a memory, a processor, and a computer program executable by the processor and stored in the memory, wherein the processor performs a window adjustment method by executing the computer program, and the window adjustment method comprises:

activating a freeform window mode of the mobile terminal;

identifying freeform windows displayed on the display screen, each of the freeform windows corresponding to an application type and being initialized with an initial size corresponding to the application type thereof;

determining one of the freeform windows as a freeform window to-be-adjusted; and acquiring adjustment parameters from an input event in real time and adjusting the freeform window to-be-adjusted in real time based on the adjustment parameters, the adjustment parameters comprising a position parameter and a size parameter;

wherein the memory stores therein an application type-window size lookup table, and the processor acquires the initial size by:

searching the application type-window size lookup table according to the corresponding application type.

7. The mobile terminal of claim 6, wherein the processor determines the freeform window to-be-adjusted by:

monitoring and locating a focus of the freeform windows.

8. The mobile terminal of claim 6, wherein the processor adjusts the freeform window to-be-adjusted by:

displaying the freeform window to-be-adjusted in full screen when the size parameter of the adjustment parameters is not less than a preset first size threshold.

9. The mobile terminal of claim 8, wherein when the freeform window to-be-adjusted is displayed in full screen, the processor moves an application displayed in the freeform window to-be-adjusted from a freeform stack to a fullscreen stack.

10. The mobile terminal of claim 6, wherein the processor acquires the adjustment parameters by:

monitoring the input event performed on the display screen in real time;

acquiring input information of the input event; and defining the adjustment parameters according to the input information.

\* \* \* \* \*